United States Patent [19]

Sato et al.

[11] Patent Number: 4,971,122
[45] Date of Patent: Nov. 20, 1990

[54] FENCE AND FENCE POSITION ADJUSTING MECHANISM IN JOINT MACHINE

[75] Inventors: Mitsumasa Sato; Kouichi Miyamoto, both of Tokyo, Japan

[73] Assignee: Ryobi Ltd., Fuchu, Japan

[21] Appl. No.: 476,920

[22] Filed: Feb. 8, 1990

[30] Foreign Application Priority Data

Feb. 17, 1989 [JP] Japan .................................. 1-38726
Feb. 17, 1989 [JP] Japan .............................. 1-18215[U]

[51] Int. Cl.⁵ ............................................. B27M 1/00
[52] U.S. Cl. ......................... 144/136 C; 144/134 D; 144/371; 409/182; 30/374; 30/376
[58] Field of Search ................. 30/374, 375, 376, 377; 144/134 D, 136 C, 371; 409/182

[56] References Cited

U.S. PATENT DOCUMENTS

| | | | |
|---|---|---|---|
| 2,635,655 | 4/1953 | Linstead | 144/124 D |
| 2,952,281 | 9/1960 | Weber | 144/134 D |
| 4,913,204 | 4/1990 | Moores et al. | 144/136 C |

FOREIGN PATENT DOCUMENTS

2838233 6/1979 Fed. Rep. of Germany .
2841983 1/1988 Fed. Rep. of Germany .

Primary Examiner—W. Donald Bray
Attorney, Agent, or Firm—Sughrue, Mion, Zinn, Macpeak and Seas

[57] ABSTRACT

A joint machine having a fence and a fence position adjusting mechanism. The mechanism adjusts a vertical position and angular orientation of the fence with respect to a pair of fence supporting members upstandingly extending from a base which accommodates therein a cutter. a hand gripper is provided between upper end portions of the fence supporting members. The mechanism includes a pair of fence fixing means. One of the fence fixing means fixes both the vertical position and angular orientation of the fence, whereas the other fixing means fixes the vertical position of the fence.

14 Claims, 5 Drawing Sheets

FENCE AND FENCE POSITION ADJUSTING MECHANISM IN JOINT MACHINE

BACKGROUND OF THE INVENTION

The present invention relates to a joint machine which forms or machines a circular grooves at respective joining end faces of workpiece such as wood members for inserting a joint piece into the grooves in order to join the woods at the joining end faces by way of the joint piece. More particularly, the invention relates to a fence and a fence position adjusting mechanism in such joint machine.

Figure 6:
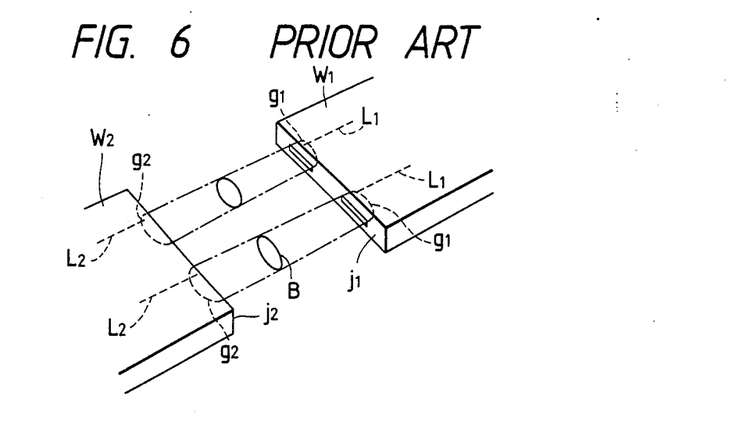
FIG. 6 is a perspective view for description of joining wood members by means of biscuits.

For joining two wood members together, one planar face of one of the wood members is formed with a pivot or a tenon and one planar face of the other wood member is formed with a tenon groove, and the tenon is forcibly fitted with the tenon groove. The formation of the tenon and the tenon groove requires time and skill. To avoid this labor, one joining method using a joint piece has been proposed as shown in FIG. 6. In this method, generally semi-circular grooves g1 and g2 are formed at joining faces j1 and j2 of wood members W1 and W2, and the joint pieces B are forcibly fitted with the grooves g1 and g2 for joining together the wood members W1 and W2. The joint pieces B are referred to as "biscuits" which have generally oval shapes and are formed of beech wood. Adhesive materials are filled at the grooves g1 and g2. When the biscuits are fitted in the grooves, the biscuits are swollen by the adhesive material to thus ensure joining between the wood members W1 and W2.

Figure 7:
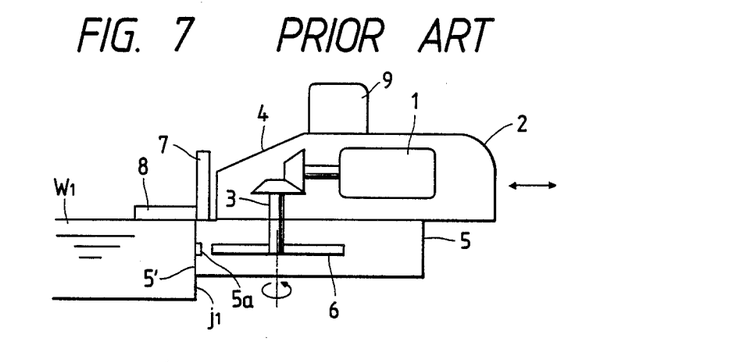
FIG. 7 is a schematic view showing a conventional joint machine.

In order to form the semi-circular grooves, various kinds of joint machines or biscuit jointers have been proposed. One conventional jointer is schematically shown in FIG. 7. The joint machine shown in FIG. 7 includes a motor case 2 accommodating therein a drive motor 1 and a gear case 4 accommodating therein a power transmission means 3 connected to the drive motor 1. The motor case 2 and the gear case 4 are provided integral with each other, and these cases 2 and 4 are slidably mounted on a base 5 whose front face is abuttable on the joining face j of the wood member W1. A cutter such as a circular saw blade 6 is rotatably accommodated within the base 5, and the cutter 6 is connected to the power transmission means 3. Further, one of the upper portions of the cases 2 and 4 is integrally provided with a grip portion 9, and a post 7 vertically extends from the front upper portion of the base 5.

A fence 8 is secured to the post 7. The fence 8 is adapted to abut against an upper surface of the wood member W1 during cutting the semi-circular groove g1. The fence 8 is provided vertically slidable along the post 7 and the vertical position of the fence 8 can be fixed. The front face of the base 5 is formed with an opening 5a through which the cutter 6 extends upon frontward movement of the motor case 2 and the gear case 4 with respect to the base 5. When the cutter 6 projects out of the opening 5a, the semi-circular groove g1 (g2) is formed at the joining face j1 (j2) of the wood members W1 (W2). By controlling the vertical fixing position of the fence 8 relative to the post 7, the cutting position of the semi-circular groove with respect to the thickness direction of the wood member is controllable.

Figure 8:
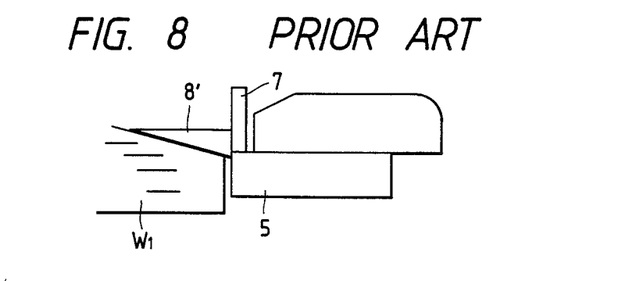
FIG. 8 is a schemtic view showing a cutting state according to the conventional joint machine.

In the above conventional structure, the front face of the base 5 and the fence 8 determine the relative position between the wood member and the joint machine, to thus determine the cutting position to the joint face j1 by the cutter 6. With the above in view, in the conventional joint machine, fences having various configurations are prepared and one fence is replaced by the other fence in accordance with the configuration of the wood member. For example, as shown in FIG. 8, if the upper surface of the wood member is inclined, a fence 8' having identical configuration is selectively assembled to the post 7. Such fence replacement may be troublesome and may lower working efficiency.

In order to solve this drawback, one proposal has been made to provide a mechanism for fixing one fence to the post at any angular orientation. However, in this mechanism, another mechanism is also required for adjusting vertical position of the fence. Consequently, intricate mechanism results, and it would be almost impossible to provide mechanism for both adjusting vertical position of the fence and the angular orientation thereof. Further, in the conventional joint machine, since the gripper portion 9 is provided integrally on the case 2 or case 4 (integral case), manually gripping force cannot be directly applied onto the fence 8 during cutting operation. Therefore, stabilized cutting operation may not be achievable.

In another aspect, for cutting the semi-circular groove, alignment lines L1, L2 are delineated on the upper surfaces of the wood members. The alignment line L1 or L2 must be aligned with a transverse center mark of the joint machine, the center mark being formed on an upper surface of the fence 8 or on the front face 5' of the base 5. In this case, when aligning the mark with the alignment line, the fence is laid over the front surface of the wood member, so that the alignment line is invisible by the fence. Accordingly, the alignment line must be delineated much longer than the length of the fence. Further, if the center mark is formed on the front end face 5' of the base 5, the mark is hidden due to the abutment of the front end face 5' on the joining face j1 of the wood member W1. Therefore, it would be difficult to provide clear visual alignment between the center mark and the alignment line.

In the conventional joint machine, the fence is of generally flat configuration. Therefore, when the operators hand is pressingly placed on the fence for pressing the upper surface of the wood, sufficient pressure force cannot be applied to the wood member. Consequently, during cutting operation by the rotation of the cutter 6, cutting position may be displaced due to cutting resistance and insufficient pressure force.

Moreover, since the cutter 6 projects toward the joining face j and is retracted into the base 5 at a position below the fence, operator's hand placed onto the fence is subjected to danger. Therefore, the operator merely places his hand onto the gripping portion 9 to avoid this danger. As a result, sufficient contact between the front end face 5' of the base 5 and the joining face j1 of the wood member may not be provided.

SUMMARY OF THE INVENTION

It is, therefore, an object of the present invention to overcome the above described drawbacks and disadvantages, and to provide an improved joint machine in which replacement work of fences can be dispensed with yet performing control to angular orientation of the fence as well as to vertical fixing position thereof relative to a post.

Another object of the invention is to provide a mechanism in the joint machine, the mechanism being capable of controlling angular orientation of the fence as well as controlling vertical position thereof.

Still another object of the invention is to provide the improved joint machine whose fence facilitates visual observation of an alignment line delineated on a workpiece.

Still another object of the invention is to provide the improved joint machine, capable of stabilizingly holding its fence during cutting operation.

These and other objects of the invention will be attained by providing a joint machine including a fence abuttable on an upper surface of a workpiece, a cutter, a base having side end portions and a front end face abuttable with an end face of the workpiece, the base accommodating therein the cutter, a drive means, a power transmission means having one end connected to the drive means and another end connected to the cutter, and a case for accommodating therein the drive means and the power transmission means, the case being slidable on the base for projecting the cutter from the front end face of the base or for retracting the cutter into the base, the improvement comprising: a pair of fence supporting members upstandingly extending from the side end portions and at positions adjacent the front end face, each of the fence supporting members being formed with a vertically elongated slot and having an upper end, the fence comprising a pair of side plates, and a holding portion abuttable on the upper surface of the workpiece and connecting the pair of side plates, the side plates being supported by the pair of fence supporting members, each of the side plates being provided with a protrusion slidably engageable with each one of the elongated slots, and being formed with an arcuate slot, and a pair of fence fixing means each extending through each of intersections defined between each of the elongated slots and each of the arcuate slots, the fence being fixed to the fence supporting members at any vertical position along the elongated slots and at any angular orientation along the arcuate slots.

DETAILED DESCRIPTION OF THE PREFERRED EMBODIMENT

Figure 1:
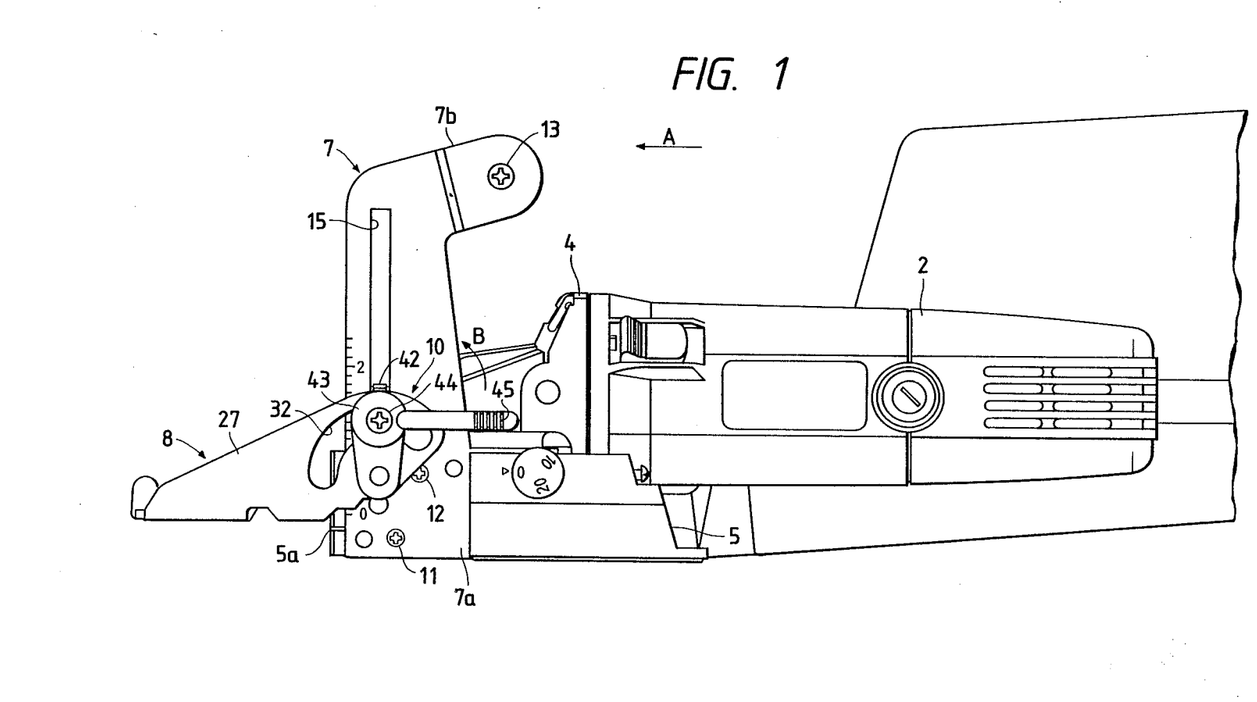
FIG. 1 is a side view showing a joint machine and a mechanism for adjusting fence position according to one embodiment of the present invention.

A joint machine having a fence position adjusting mechanism according to one embodiment of this invention will be described with reference to FIGS. 1 thru 5. As shown in FIG. 1, similar to the conventional joint machine, the jointer of this invention includes a motor case 2 accommodating therein a drive motor 1, and a gear case 4 accommodating therein a power transmission means 3 drivingly connected to the drive motor 1. The motor case 2 and the gear case 4 are provided integral with each other (hereinafter simply referred to as "integral case"). The joint machine also includes a base 5 accommodating therein a cutter 6. The integral case is provided slidable in a direction indicated by an arrow A on the base 5. The base 5 has a front end face formed with an opening 5a which allows the cutter 6 to pass therethrough when the integral case is moved in the A direction.

A pair of fence supporting members 7 are upstandingly provided at the front side ends of the base 5. That is, each of the base portions 7a of the upstanding fence supporting members 7 is fixed to each of the front side ends of the base 5 by means of bolts 11 and 12. Further, each of the fence supporting members 7 has an upper end portions 7b between which a grip member 14 (FIG. 3) is bridged by means of bolts 13 (FIG. 1). The grip member 14 extends in a direction parallel with the base 5. Therefore, a grip portion is provided at relatively front portion of the jointer (at a position ahead the integral case).

Each of the fence supporting members 7 is formed with a vertically extending elongated slot 15 which allows the fence 8 to slidably movable in vertical direction. Incidentally, the pair of fence supporting members 7 must extend in exactly vertical direction and in parallel with each other. For this, the base 5 is provisionally formed with holes (not shown) engageable with positioning pins (not shown) provisionally fixed to the supporting members 7. After the engagement of the pins with the holes, the bolts 11 and 12 are fastened to the base 5.

Figure 2:
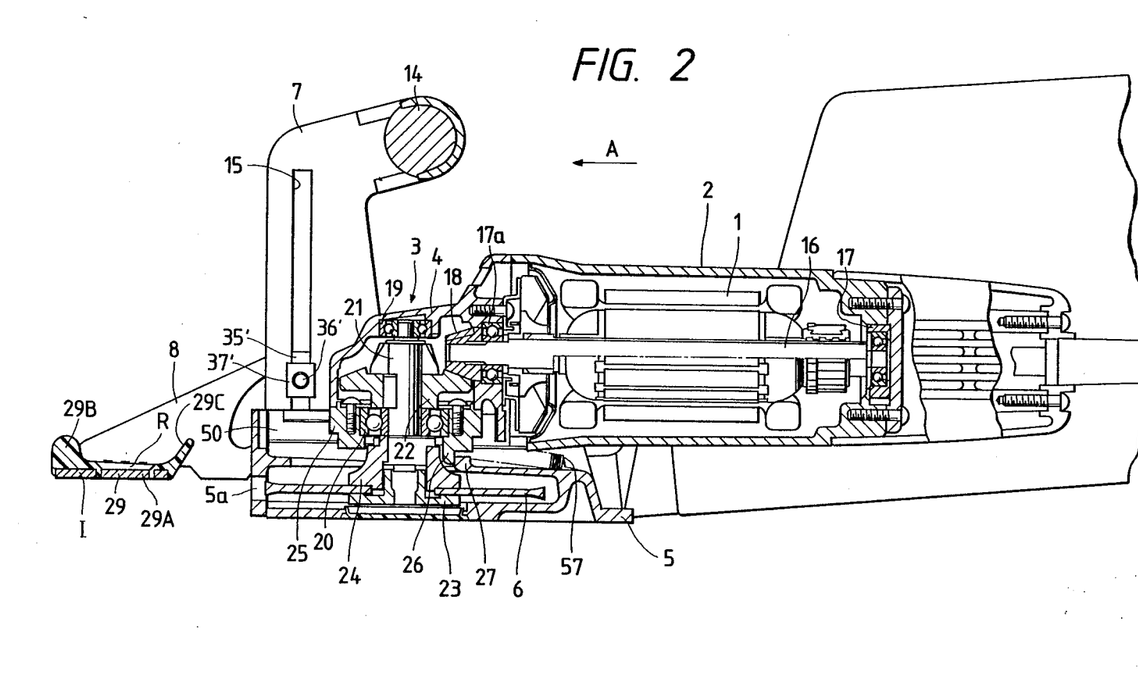
FIG. 2 is a side view partly cross-sectioned showing the joint machine and the fence position adjusting mechanism according to one embodiment of the present invention.

An internal construction of the joint machine having the fence 8 and a fence position adjusting mechanism is best shown in FIG. 2. As shown, the drive motor 1 is housed within the motor case 2, and a motor shaft 16 of the drive motor 1 is rotatably journalled by bearings 17 and 17a. A bevel gear 18 is fixedly mounted on one end portion of the motor shaft 16. On the other hand, the power transmission means 3 includes a rotary shaft 21 journalled by bearings 19 and 20, and a bevel gear 22 fixedly mounted on an upper portion of the rotary shaft 21 and meshedly engageable with the bevel gear 18. The cutter 6 is mounted on a lower portion of the rotary shaft 21. The cutter 6 is detachably supported to the rotary shaft 21 by means of inner flange 24 and an outer flange 23.

A slide 25 is provided integral with a lower end portion of the gear case 4, whereas the base 5 has an upper portion formed with a guide groove 50. Therefore, the slider 25 is slidable with respect to the guide groove 50. The slider 25 has a lower face from which a protruding member 26 extends downwardly. On the other hand, the upper end portion of the base 5 is provided with a stop member 27 abuttable on the protruding member 26. That is, rearward movement of the integral case is restrained by the abutment between the protrusion 28 and the stop member 27. Further, a tension spring 57 is interposed between the base 5 and the slider 25 so as to normally urge the slider 25 or the integral case in a direction opposite the arrow A. As a result, the cutter or the circular saw blade 6 can be positioned within the base 5 during non-service state of the biscuit jointer for safety purpose.

Figure 3:
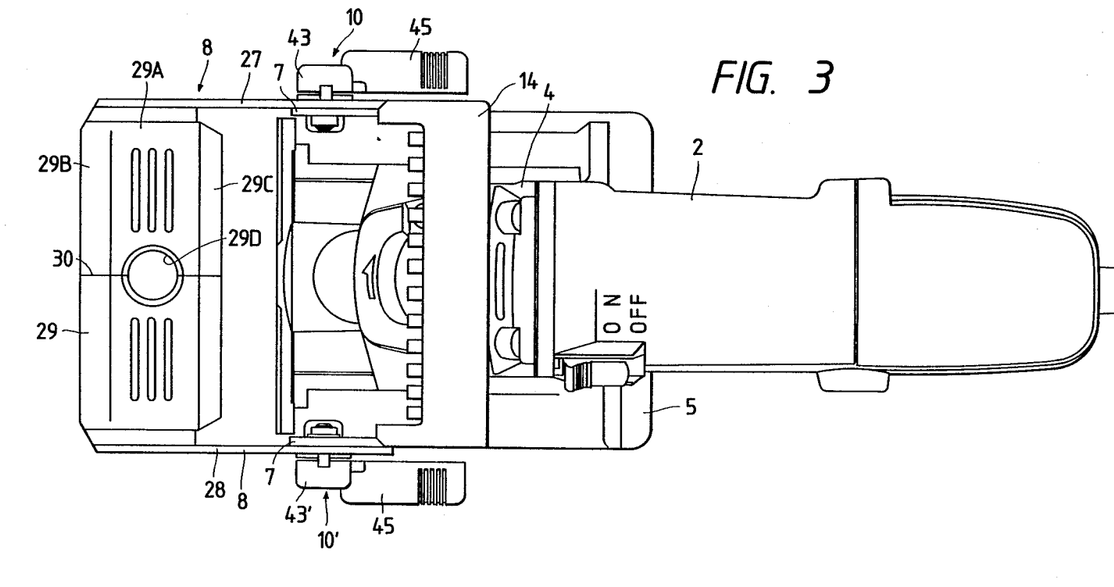
FIG. 3 is a plan view showing the joint machine and the fence position adjusting mechanism according to one embodiment of the present invention.

The fence 8 according to this invention is best shown in FIGS. 2 and 3. As shown in FIG. 3, the fence has generally U-shape configuration in plan view and includes a pair of side plates 27 and 28 slidably fixed to the fence supporting members 7 and 7, and a holding plate 29 connecting between the pair of side plates 27 and 28. For manufacturing the fence 8, a flat iron plate is prepared. The iron plate is subjected to cutting into U-shape corresponding to the shapes of the side plates 27 28 and the holding plate 29. The cut iron plate portions are folded by 90 degrees so as to provide the side plates 27 and 28. Therefore, the side plates 27 and 28 are provided integral with each other. The holding plate 29 has an area sufficient enough for placing an operator's hand thereon. Further, a line mark 30 (FIG. 3) is provided on an upper surface of the holding plate 29 for aligning alignment marks L1, L2 (FIG. 6) delineated on the upper surface of the workpiece W1, W2. Details of the side plates 27 is described later in connection with a fence position adjusting mechanism. Here, details of the holding plate 29 will be described which is the primary portion of the fence 8.

As shown in FIG. 2, the holding plate 29 of the fence includes an intermediate horizontal portion 29A, a front projecting portion 29B and a rear projecting portion 29C. In the embodiment shown in FIG. 2, a resin reinforcing plate R is fixedly disposed over an iron base plate I by adhesive agent or by screws (not shown). The reinforcing plate R has a first projecting portion serving as the front projecting portion 29B. The front projecting portion 29B serves as a manual holding portion which facilitates depression of the holding plate 29 toward the workpiece W. The reinforcing plate R is bent upwardly at its rear portion which serves as the rear projecting portion 29C. The rear projecting portion functions as a cover for covering the cutter blade 8 when it is projected outwardly through the opening 5a. Owing to the front and the rear projecting portions 29B and 29C, the holding plate 29 can be easily depressed manually toward the workpiece W, and operator's hand can be protected against the cutter 6. As a modification, the front projecting portion 29B is only formed by fixing a resin body at a front portion of the iron plate by means of adhesive agent or bolts, whereas the rear projecting portion 29C can be formed by bending the iron plate upwardly.

Further, as shown in FIG. 3, the intermediate horizontal portion 29A of the holding plate 29 is formed with a window 29D by forming bores on the iron plate I and the resin reinforcing plate R (In the modification just described above, the corresponding bore is only formed in the iron plate I). The line mark 30 is provided at front and rear projecting portions 29B and 29C and the intermediate portion 29A except the window 29D. Therefore, alignment between the alignment lines delineated on the workpiece and the line mark 30 can be easily performed. In other words, it is unnecessary to provide an elongated alignment lines on the workpiece.

The above-described pair of side plates 27 and 28 are fixed to or released from the fence supporting members 7 and 7 by means of fence fixing means 10 and 10'. A combination of the fence supporting members 7, 7, the side plates 27, 28, and the fence fixing means 10,10' will provide a fence position adjusting mechanism which adjusts angular orientation of the fence 8 as well as vertical position thereof with respect to the workpiece W. Stated briefly with reference to FIG. 1, the fence fixing means 10 10' extends through an intersecting portion defined between arcuate slots 32 formed in the side plates 27 28 and the vertically elongated slots 15 formed in the fence supporting members 7, 7. The fence fixing means fixes the fence 8 to the fence supporting members 7 at any vertical position along the slots 15 and at any angular position along the arcuate slot 32. The fastening or unfastening to the fence fixing means can be carried out by rotating a lever 45 for changing vertical and angular positions of the fence 8.

The fence position adjusting mechanism will be described in detail with reference to FIGS. 1, 4 and 5. One of the side plate 27 of the fence 8 is formed with a protrusion 31 extending inwardly which is slidingly engageable with the elongated slot 15 formed in the upstanding fence supporting member 7. This protrusion 31 also serves as a pivot shaft about which the fence 8 is angularly rotatable with respect to the fence supporting member 7. Further, an arcuate slot 32 is formed in the side plate 27. The arcuate slot 32 has a arcuate curvature whose imaginary center is coincident with the protrusion 31. Furthermore, a plurality of recesses 33 are formed on an inner surface of the side plate 27. The recesses 33 are arranged on an imaginary arcuate curvature whose center is also at the protrusion 31. These recesses 33 are arranged at equal angular distance such as by every 30 degrees. Incidentally the other side plate 28 is also formed with inwardly extending protrusion 31' and an arcuate slot 32. The protrusions 31 and 31' are provided coaxial with each other, and the arcuate slots 32 and 32 are also provided in confronting relationship with each other.

Figure 4:
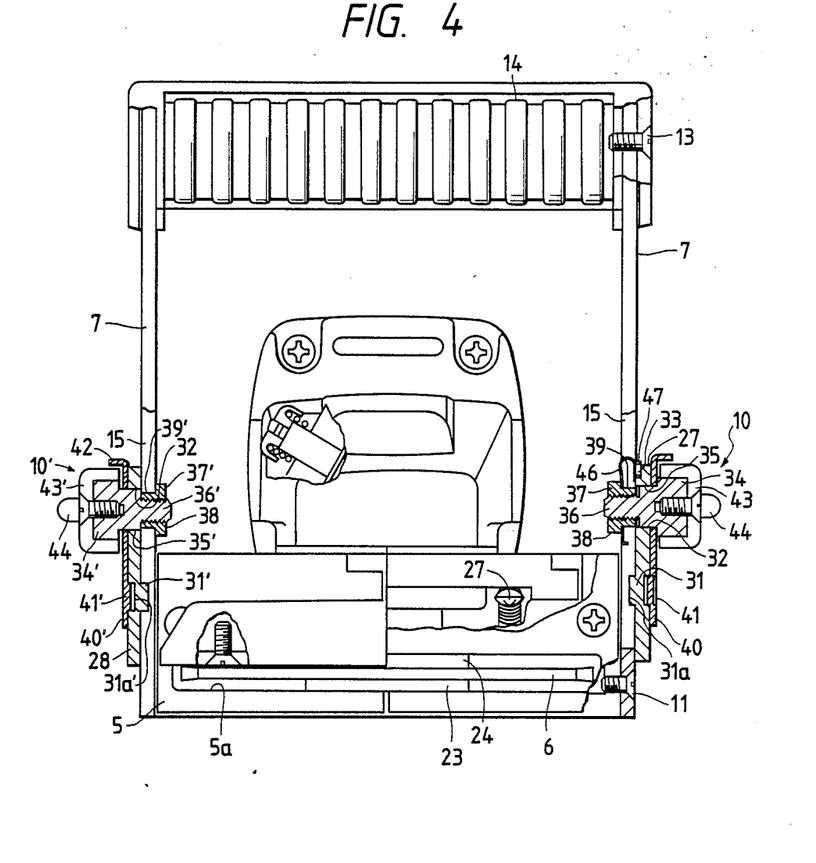
FIG. 4 is a front view partly cross-sectioned showing a fence, and the fence positon adjusting mechanism including a fence supporting means and fence fixing means according to one embodiment of the present invention.

As shown in FIGS. 1 and 4, the fence fixing means 10,10' such as bolt 34 (34') is insertedly positioned at intersecting portion defined between the elongated slot 15 and the arcuate slot 32. Each of the bolts 34, 34' has a hexagonal bolt head positioned outwardly, an intermediate cylindrical portion 35 (35'), and a thread portion 36 (36') positioned inwardly. A diameter of the intermediate cylindrical portion 35 is different from that of the thread portion 36 to thus provide a stepped portion at their boundary. Further, the diameter of the cylindrical portion 35 is larger than a width of the elongated vertical slot 15, whereas the diameter of the thread portion 36 is smaller than the width. Therefore, only the thread portion 35 of the bolt 34 can pass through the elongated slot 15.

The inner thread portion 36 (36') is threadingly engageable with a nut 37 (37'). The nut 37 (37') has a rectangular head 38 (38') and a rectangular projection 39 (39'). The rectangular projection 39 (39') is positioned in the elongated slot 15 and is slidable with respect thereto, whereas the rectangular head 38 is positioned inwardly with respect to the fence suppoting member 7 as best shown in FIG. 4. The rectangular projection 39 (39') has a width in conformance with the width of the elongated slot 15. Therefore, free rotation of the rectangular projection 39 (39') within the slot 15 is prevented.

The hexagonal head of the bolt 34 (34') is crowned with a cup shaped member 43 (43') and the cup shaped member 43 (43 ') is fixedly secured to the hexagonal head by a bolt 44 (44'). Further, a lever 45 (45') as shown in FIG. 1 is integrally connected to the cup shaped member 43 (43'). Upon manipulation of the lever 45 (45'), threading amount between the bolt 34 (34') and the nut 37 (37') is controllable, and therefore, the side plates 27, 28 can be fixedly clamped to the fence supporting member 7, 7' or can be released therefrom.

One fence fixing means 10' including the bolt 34' and the nut 37' will be described. A washer 40 having generally egg shape is interposed between the hexagonal head of the bolt 34' and the side plate 28. The washer 40 has an intermediate portion formed with a hole through which the intermediate cylindrical portion 35' of the bolt 34' extends. Further, a free end of the washer 40 is provided with a protrusion 41' extending inwardly. A recess 31a' is formed at an outer surface of the side plate 28 at a position coaxial with the protrusion 31', and the protrusion 41' of the washer 40 is engageable with the recess 31a' of the side plate 28. Therefore, rotation of the washer 40 about the intermediate cylindrical portion 35' is prevented by the engagement between the protrusion 41' and the recess 31a'. One end of the washer 40' is bent to have a bent portion 42. The lever 45' is abuttable on the bent portion 42 so that excessive angular rotation of the lever 45' can be restrained, to thereby prevent the nut 37' from being separated from the bolt 34'. The same is true with respect to the other fence fixing means 10. However, the fence fixing means 10, 10' is different from each other with respect to the following aspects.

Regarding the bolt 34' of the fence fixing means 10', the intermediate cylindrical portion 35' has an axial length which is larger than a total thicknesses of the side plate 28 and the washer 40'. The stepped portion defined at the boundary between the cylindrical portion 35' and the thread portion 36' merely serves as an annular seat which is in surface contact with the fence supporting member 7. Therefore, the vertical position of the side plate 28 is fixed by the clamping between the bolt 34' and the nut 37'. That is, the fence supporting member 7 is clamped by the annular seat and the rectangular head 38' of the nut 37', and as a result, the vertical position of the side plate 28 is determined. On the other hand, since the axial length of the intermediate cylindrical portion 35' is larger than the total thicknesses of the side plate 28 and the washer 40', the side plate 28 and the washer 40' are not pressed between the hexagonal head and the fence supporting member 7. Accordingly, the side plate 28 is still pivotally movable about the protrusion 31' along the arcuate slot 32.

Figure 5:
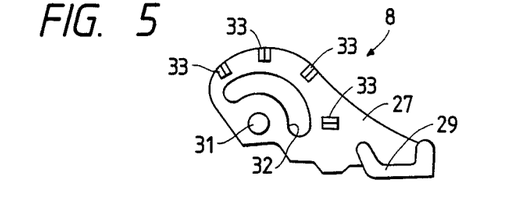
FIG. 5 is a fragmental plan view showing a side plate for supporting the fence according to one embodiment of the invention.

On the other hand, regarding the other fence fixing means 10 (right side in FIG. 4), the above described side plate 27 shown in FIG. 5 is provided. Further, a leaf spring 46 is disposed over the rectangular projection 39 of the nut 37. The leaf spring 46 has a dimension which allows sliding contact with respect to the elongated slot 15. The leaf spring has a U-shaped end portion whose free end is provided with a V-shaped projection 47 extending outwardly. The V-shaped protrusion 47 is resiliently and selectively engageable with one of the recesses formed in the inner surface of the side plate 27. By this engagement, angular orientation of the side plate 27 can be fixed. Furthermore, the intermediate cylindrical portion 35 of the bolt 34 has an axial length slightly smaller than the total thicknesses of the washer 40 and the side plate 27. Therefore, inner face of the hexagonal bolt head presses the side plate 27 through the washer 40. That is, the side plate 27 and the washer 40 are pressed by the inner face of the hexagonal head of the bolt 34 and the surface of the fence supporting member 7 upon clamping the bolt 34 and the nut 37. As a result, vertical position of the side plate 27 and angular orientation thereof can be fixed by the right side fence fixing means 10.

With the structure, if the levers 45 are pivotally moved in a direction indicated by an arrow B in FIG. 1, the threading engagements between the bolts 34, 34' and the nut 37, 37' are released. However, since the levers are brought into abutments with the bent portions 42, 42' of the washers 40, 40', over-rotation of the levers can be prevented, to thus prevent the nuts 37, 37' from being dropped off from the bolts 34, 34'.

In this state, the hexagonal heads of the bolts 34, 34' are moved away from the fence supporting members 7, 7, so that the annular seats defined at the stepped portions of the bolts are moved away from the fence supporting members 7, 7. Accordingly, side plates 27, 28 of the fence 8 are unclamped from the fence supporting members 7, 7. Consequently, the fence 8 is slidingly movable in vertical direction along the elongated vertical slots 15, 15 of the fence supporting members 7, 7. In this sliding movement, since the projections 31, 31' of the side plates 27, 28 are also in sliding contacts with the elongated slots 15, 15, the fence 8 is subjected to smooth guiding during its vertical movement. Orientation of the fence 8 can also be changed in this unclamped condition.

The vertical position of the fence can be thus changed, and orientation of the fence can slso be changed, if desired. Thereafter, the levers 45 are rotated in a direction opposite the arrow B in FIG. 1, to thereby fix the fence 8 to the fence supporting members 7, 7 with a desired vertical position and orientation of the fence 8.

Next, if the orientation of the fence 8 is only intended to be changed without changing vertical position of the fence 8, only one of the levers 45 associated with the fence fixing means 10 (right side in FIG. 4) is only pivotally moved in the B direction in FIG. 1. In this case, only one of the bolt 34 is moved away from the fence supporting member 7, so that the side plate 27 of the fence 8 becomes freely rotatable about the protrusion 31 along the arcuate slot 32. On the other hand, it is unnecessary to move the lever 45 associated with the other fence fixing means 10', since the side plate 28 is always held rotatable about the projection 31' along the arcuate slot 32. For the determination of the angular orientation, the V-shaped projection 47 of the leaf spring 46 may provide a click with respect to the plurality of recesses 33 formed in the side plate 27. Therefore, angular position can be easily determined by the selective engagement.

Further, in the embodiment, it is possible to adjust vertical position of the fence 8 without changing orientation of the fence 8. That is, even when the right and left fence fixing means 10 and 10' are slightly unclamped so as to allow vertical sliding movement of the side plates 27 and 28, the V-shaped projection 47 of the leaf spring 46 can still resiliently maintain engagement with one of the recesses 33. Consequently, the fence 8 is vertically moved with maintaining initial orientation of the fence 8.

In the above described embodiment, axial lengths of the intermediate cylindrical portions 35,35' of the bolts 34,34' are different from each other in the fence fixing means 10, 10', and cross-sectional shapes of the cylindrical portions and the thread portions are different from each other. However, as a modification, in one of the fence fixing means 10 (right side in FIG. 4), a cross-sectional shape of the intermediate cylindrical portion 35 can be made identical with that of the thread portion 36, so as to allow the cylindrical portion 35 to also pass through the elongated slot 15. In other words, for fixedly clamping the side plate 27 in order to fix vertical position as well as angular orientation of the fence 8, it is unnecessary to provide the stepped portion in the bolt 34.

In view of the foregoing, the joint machine according to the present invention provides the following advantages and effects:

(a) The vertical position and angular orientation of the fence 8 can be easily adjusted by a simple fence position adjusting mechanism. Therefore, fence replacement work can be dispensed with in accordance with the intended cutting work, and optimum cutting position can be promptly obtained.

(b) One of the side plate 28 of the fence is always rotatable relative to the fence fixing means 10'. Therefore, angular orientation of the fence 8 can be easily adjusted by merely unclamping remaining one of the fence fixing means 10 relative to the other side plate 27.

(c) The other side plate 27 is formed with a plurality of recesses 33 intermittently arranged at the imaginary arcuate curvature, and the V-shaped projection 47 of the leaf spring 46 is selectively and resiliently engageable with one of the recesses 33. Therefore, desired angular orientation of the fence 8 can be easily provided.

(d) The pair of upstanding fence supporting members 7 and 7 are connected by the hand gripping portion 14, and therefore, sufficient pressure can be applied to the workpiece via the base 5, and as a result, stabilized cutting operation is achievable.

(e) Since the holding plate 29 of the fence 8 is provided with the upwardly projecting portion 29B at the front portion thereof, an operator can easily hold the holding plate 29, to thereby perform accurate cutting operation. Further, the holding plate 29 of the fence 8 has the other upwardly projecting portion 29C at a rear portion thereof, the rear projection functions as a protective cover so as to protect the operator's hand placed on the holding plate 29 against the cutter 6 projecting out of the front opening 5a. As a result, safety cutting work is attainable.

(f) The center line 30 is provided at the upper surface of the holding plate 29 for facilitating the alignment with the alignment lines L1,L2 delineated on the workpiece. Such center line or mark is clearly visible for the operator. Further, the window 20D is formed on the holding plate 29. Therefore, alignment between the center line 30 and the alignment line L1 is easily attainable, and it is unnecessary to draw the alignment line much longer than the length of the holding plate 29.

While the invention has been described in detail and with reference to specific embodiment thereof, it would be apparent to those skilled in the art that various changes and modifications can be made therein without departing from the spirit and scope of the invention.

What is claimed is:

1. A joint machine including a fence abuttable on an upper surface of a workpiece, a cutter, a base having side end portions and a front end face abuttable with an end face to the workpiece, the base accommodating therein the cutter, a drive means, a power transmission means having one end connected to the drive means and another end connected to the cutter, and a case for accommodating therein the drive means and the power transmission means, the case being slidable on the base for projecting the cutter from the front end face of the base or for retracting the cutter into the base, the improvement comprising:

a pair of fence supporting members upstandingly extending from the side end portions and at positions adjacent the front end face, each of the fence supporting members being formed with a vertically elongated slot and having an upper end;

the fence comprising a pair of side plates, and a holding portion abuttable on the upper surface of the workpiece and connecting the pair of side plates, the side plates being supported by the pair of fence supporting members, each of the side plates being provided with a protrusion slidably engageable with each of the elongated slots, and being formed with an arcuate slot; and a pair of fence fixing means each extending through each of intersections defined between each of the elongated slots and each of the arcuate slots, the fence being fixed to the fence supporting members at any vertical position along the elongated slots and at any angular orientation along the arcuate slots.

2. The joint machine as claimed in claim 1, wherein each of the arcuate slots has an arcuate curve which constitutes one part of an imaginary circle, a center of the imaginary circle being coincident with the protrusion of the side plate.

3. The joint machine as claimed in claim 2, wherein at least one of the side plates is formed with a plurality of recesses at its inner surface, the plurality of recesses being arranged intermittently and equi-distantly along an imaginary arcuate curvature whose center is coincident with the protrusion, and wherein one of the fence fixing means associated with the one of the side plates further comprises a resilient member slidably disposed in the elongated slot of one of the fence supporting members and having a projection selectively engageable with one of the recesses, whereby the fence undergoes stepwise adjustment in its angular orientation.

4. The joint machine as claimed in claim 3, wherein one of the side plates is fixedly clampable by the one of the fence fixing means to the one of the fence supporting members, and the other side plate is loosely supported by the other fence fixing means to the other fence supporting member, whereby one of the fence fixing means adjustably fixes the vertical position and angular orientation of the fence whereas the other fence fixing means adjustably fixes the vertical position of the fence.

5. The joint machine as claimed in claim 1, further comprising a hand gripping portion integrally provided between the upper ends of the fence supporting members.

6. The joint machine as claimed in claim 4, wherein the one of the fence fixing means comprises a bolt, and a nut, the bolt comprising a hexagonal bolt head, an intermediate cylindrical portion and a thread portion, the nut comprising a rectangular head and a rectangular projection slidingly insertable in one of the elongated slots, the thread portion being threadingly engageable with the rectangular projection, the intermediate cylindrical portion extending through the arcuate slot of the one of the side plates.

7. The joint machine as claimed in claim 6, wherein the one of the fence fixing means further comprises a washer member interposed between the one of the side plates and the hexagonal bolt head, the washer member being disposed over the intermediate cylindrical portion.

8. The joint machine as claimed in claim 7, wherein the diameter of the intermediate cylindrical portion is greater than the thread portion, and wherein the intermediate cylindrical portion has an axial length smaller than a total thickness of the washer member and the one of the side plates, the diameter of the intermediate cylindrical portion being greater than a width of the one of the elongated slots.

9. The joint machine as claimed in claim 6, wherein the diameter of the intermediate cylindrical portion is equal to that of the thread portion, the intermediate cylindrical portion and the thread portion being passable through the one of the elongated slots.

10. The joint machine as claimed in claim 6, wherein the other fence fixing means comprises a second bolt, and a second nut, the second bolt comprising a second hexagonal bolt head, a second intermediate cylindrical portion and a second thread portion, the second nut comprising a second rectangular head and a second rectangular projection slidingly insertable in the other elongated slot of the other fence supporting member, the second thread portion being threadingly engageable with the second rectangular projection, the second intermediate cylindrical portion extending through the arcuate slot of the other side plate, and diameter of the second intermediate cylindrical portion being greater than that of the second thread portion, the diameter of the second intermediate cylindrical portion being greater than a width of the slot of the other fence supporting member.

11. The joint machine as claimed in claim 10, wherein the other fence fixing means further comprises a second washer member interposed between the other side plate and the second hexagonal bolt head, the second washer member being disposed over the second intermediate cylindrical portion, and wherein the second intermediate cylindrical portion has an axial length greater than a total thicknesses of the second washer member and the other side plate.

12. The joint machine as claimed in claim 1, wherein the holding portion of the fence has a U-shape cross-section and comprises an intermediate horizontal portion, a front projecting portion and a rear projecting portion, the front projecting portion functioning as a hand grip portion and the rear porjecting portion functioning as a cover for protection against the cutter.

13. The joint machine as claimed in claim 12, wherein at least the front projecting portion comprises a resin protective member.

14. The joint machine as claimed in claim 12, wherein the intermediate horizontal portion is formed with a window, and wherein the holding portion has an upper surface formed with a line mark which is alignable with an alignment line delineated on the upper surface of the workpiece.

* * * * *